United States Patent [19]

Matsuzaki

[11] Patent Number: 5,220,471
[45] Date of Patent: Jun. 15, 1993

[54] AIR BEARING SLIDER HAVING A LONGITUDINAL GROOVE IN SURFACE REMOTE FROM RECORDING MEDIUM

[75] Inventor: Mikio Matsuzaki, Tokyo, Japan

[73] Assignee: TDK Corporation, Tokyo, Japan

[21] Appl. No.: 905,190

[22] Filed: Jun. 26, 1992

Related U.S. Application Data

[63] Continuation of Ser. No. 07/566,761, Aug. 14, 1990, abandoned.

[51] Int. Cl.$^5$ .............................................. G11B 5/60
[52] U.S. Cl. ................................................... 360/103
[58] Field of Search ................................ 360/103, 104

[56] References Cited

U.S. PATENT DOCUMENTS

| | | | |
|---|---|---|---|
| 3,990,106 | 11/1976 | Kameyama et al. | 360/103 |
| 4,130,847 | 12/1978 | Head et al. | 360/122 |
| 4,190,872 | 2/1980 | Jones, Jr. et al. | 360/125 |
| 4,218,715 | 8/1980 | Garnier | 360/103 |
| 4,219,853 | 8/1980 | Albert et al. | 360/103 |
| 4,219,854 | 8/1980 | Church et al. | 360/123 |
| 4,803,577 | 2/1988 | Ezaki et al. | 360/102 |
| 4,870,520 | 9/1989 | Shaw | 360/103 |

*Primary Examiner*—Robert S. Tupper
*Attorney, Agent, or Firm*—Oblon, Spivak, McClelland, Maier & Neustadt

[57] ABSTRACT

A thin film magnetic head comprises a slider and a reading/writing element attached to an end surface of the slider, wherein the reading/writing element is disposed at an end surface in the longitudinal direction of the slider when the longitudinal direction and the width direction are determined on the surface which faces a magnetic recording medium, of the slider, and the slider has a linear groove in the surface opposite the surface which faces the magnetic recording medium, at the intermediate portion in the width direction of the slider and along the longitudinal direction.

6 Claims, 7 Drawing Sheets

AIR BEARING SLIDER HAVING A LONGITUDINAL GROOVE IN SURFACE REMOTE FROM RECORDING MEDIUM

This application is a continuation of application Ser. No. 07/566,761, filed on Aug. 14, 1990, now abandoned.

BACKGROUND OF THE INVENTION

1. Field of the Invention

The present invention relates to a flying type thin film magnetic head provided with a reading/writing element at an end surface of a slider. More particularly, it relates to a flying type thin film magnetic head wherein the surface which opposes a magnetic medium, of the slider is flat and without rail portions each provided with a tapered portion at its one end.

2. Discussion of Background

There has been known, for a magnetic disk drive, a flying type thin film magnetic head which floats with a space by a minute air bearing to a magnetic recording medium by utilizing a dynamic pressure resulted when the magnetic recording medium is moved. Such flying type thin film magnetic head is disclosed in U.S. Pat. Nos. 4,130,847, 4,218,715 and 4,219,853. Namely, the basic construction of the conventional magnetic head is such that two rail portions are formed with a space therebetween at a surface of a slider made of ceramics which opposes the magnetic recording medium so that the surface between the rail portions functions as an air bearing surface, and a tapered portion is formed at each one end (at the air intake side) of the rail portions so that a lifting force is produced at the tapered portions in association with the magnetic recording medium. The reading/writing element is a thin film magnetic head element prepared in accordance with the same process as an IC manufacturing technology, and the reading/writing element is formed or attached at the air discharging side which opposes the tapered portions of the slider.

In the thin film magnetic head of this kind, there is a trend of miniaturization in order to comply with a demand of high density and high speed magnetic recording. The miniaturization of the thin film magnetic head is effective to reduce a flying height necessary for the high density recording and to reduce a spacing loss. Further, it is advantageous to increase the resonance frequency in association with a gimbal device, to eliminate crashing and to improve durability. In addition, an appropriate balance is obtainable between the dynamic pressure and the pressure of a supporting spring and the posture of the magnetic head can be properly maintained, whereby a stable flying characteristic can be obtained. Further, reduction in the mass of the magnetic head obtained by the miniaturization increases the speed of accessing movement of an arm for supporting the gimbal device.

It is, however, difficult to reduce the size of the conventional flying type thin film magnetic head because it has a complicated structure such that the rail portions and the tapered portions are provided at the surface of the slider opposing the magnetic recording medium. To solve this problem, there was proposed a thin film magnetic head wherein the surface of the slider opposing the magnetic recording medium is made flat without forming the rail portions (e.g. in U.S. Pat. No. 4,803,577). FIG. 8 is a perspective view of such thin film magnetic head of the above-mentioned type. In FIG. 8, a reference numeral 1 designates a slider, a numeral 2 designates a reading/writing element and numerals 3, 4 designate bonding pads. The slider 1 has a medium-opposing surface 101 which is made flat without forming rail portions and tapered surfaces for producing a floating force, and the opposing surface 101 functions, as a whole, as an air bearing surface.

The reading/writing element 2 is attached to an end surface of the slider 1 which is an end in the direction of air discharging in combination with the magnetic recording medium. The reading/writing element 2 used is a single which is disposed around an intermediate portion in the width direction of the slider 1.

The bonding pads 3, 4 are connected to both ends of a conductor coil film which constitutes the reading/writing element 2.

In a case that the magnetic head is used in a magnetic disk drive, it is driven by a so-called contact.start.stop method wherein the surface 102 opposite the medium-opposing surface 101 is attached to a magnetic head supporting device (a gimbal device) (not shown) while the medium-opposing surface 101 is brought into in spring-contact with the surface of the magnetic disk, and starting and stopping are carried out in this state. When the magnetic disk is in a stationary state, the medium-opposing surface 101 is pushed to the surface of the magnetic disk by the spring action of the magnetic head supporting device. However, when the magnetic disk is rotated, a dynamic pressure for floating the slider 1 to the medium-opposing surface 101 is produced, whereby a flying height obtained by balancing the dynamic pressure and the spring pressure of the magnetic head supporting device is provided.

Since the thin film magnetic head as shown in FIG. 8 is provided with the medium-opposing surface 101 in the slider 1 which is simply flat without rail portions, it is possible to reduce the size of the magnetic head to thereby assure the above-mentioned advantage.

However, the above-mentioned thin film magnetic head had the following problems.

(a) A recess may be produced at an intermediate portion in the width direction of the medium-opposing surface 101 due to deformation in a workpiece during machining operations in order to produce the slider, as illustrated in FIG. 9 with a great exaggeration. When such a recess is produced in the medium-opposing surface 101, a proper contact of the magnetic head to the magnetic disk can not be obtained, whereby a spacing loss becomes large and head-crashing may be easily caused. The durability of the magnetic head is also reduced.

(b) Since the shape of the slider is cubic as a whole, when the surface area of the medium-opposing surface 101 is reduced, the surface area of the surface 102 opposite the medium-opposing surface 101 is also reduced. Since the surface 102 constitutes a portion to which a magnetic head supporting device is attached, reduction in the surface area 101 also invites reduction in the surface area of the surface area 102 to which the magnetic head supporting device is attached. Accordingly, as the size of the slider 1 is miniaturized, it becomes difficult to attach the magnetic head supporting device.

SUMMARY OF THE INVENTION

It is an object of the present invention to provide a thin film magnetic head capable of providing an excellent head touch, reducing a spacing loss, minimizing head crashing, and facilitating determination in position of a magnetic head supporting device by forming the medium-opposing surface of the slider into a convex form.

The foregoing and other objects of the present invention have been attained by providing a thin film magnetic head which comprises a slider and a reading/writing element attached to an end surface of said slider, wherein said reading/writing element is disposed at an end surface in the longitudinal direction of said slider when the longitudinal direction and the width direction are determined on the surface which faces a magnetic recording medium, of said slider, and said slider has a linear groove in the surface opposite the surface which faces the magnetic recording medium, at the intermediate portion in the width direction of the slider and along the longitudinal direction.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
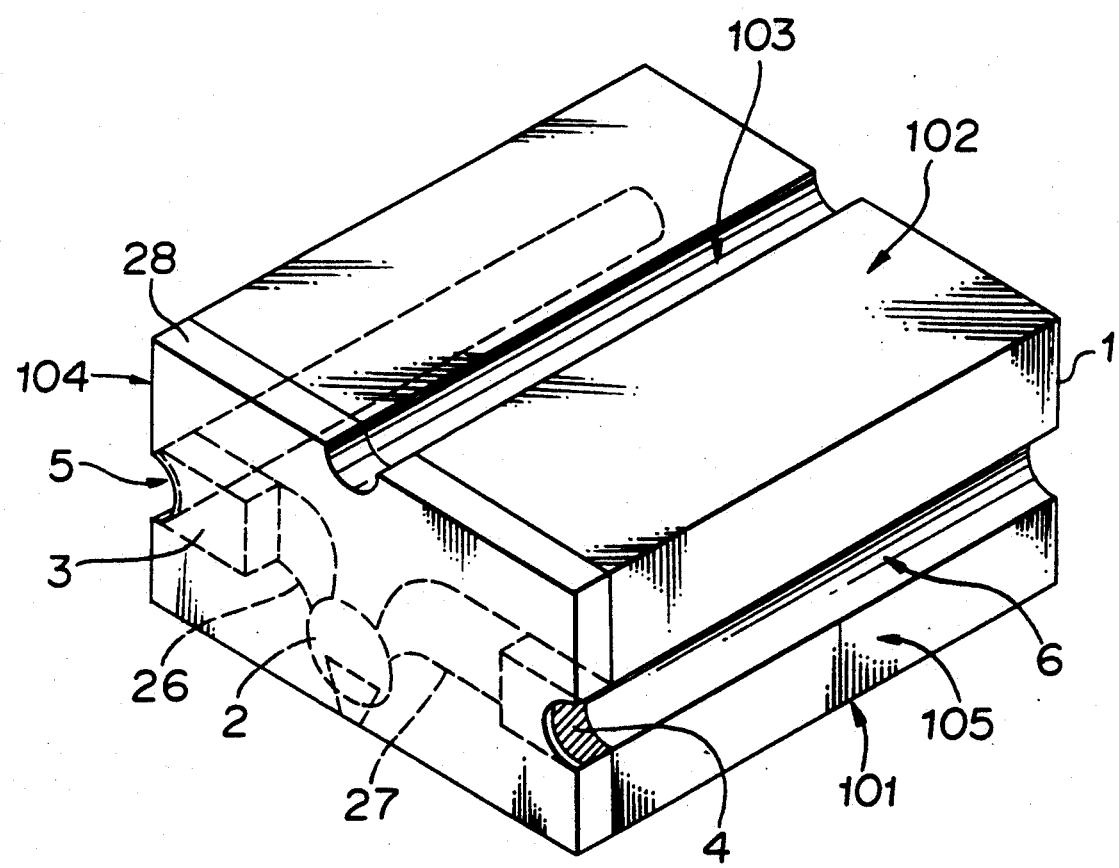
FIG. 1 is a perspective view of an embodiment of the thin film magnetic head according to the present invention.

Referring to the drawings, wherein the same reference numerals designate the same or corresponding parts throughout the several views, and more particularly to FIG. 1 thereof, there is shown in perspective view an embodiment of the thin film magnetic head according to the present invention. In FIG. 1, a single reading/writing element 2 is disposed in an intermediate portion in the width direction of the medium-opposing surface 101 of a slider 1 at its one end in the longitudinal direction, when the longitudinal direction and the width direction are determined on the medium-opposing surface of the slider 1.

The slider 1 has a linear groove 103 in the surface 102 which is opposite the medium-opposing surface 101, at an intermediate portion in the width direction and along the longitudinal direction. The groove 103 may be of a semi-circular groove or a rectangular groove in cross section, and it is formed in the entire length of the slider 1. By forming such groove 103, the medium-opposing surface 101 of the slider 1 is formed to be a curved surface in a convex form due to tensile stresses created during manufacture. Therefore, the intermediate portion in the width direction where the reading/writing element 2 is located is the highest and slopes are formed from the intermediate portion to both edges in the width direction so as to gradually decrease in level. Accordingly, the medium-opposing surface 101 of the slider 1 which is deformed in a concave form due to a strain caused when the surface 101 is processed is corrected and the surface 101 is conversely deformed into a convex form due to a strong stress by the groove 103, whereby there is obtainable a thin film magnetic head capable of providing an excellent head touch, reducing a spacing loss, minimizing head crashing and increasing durability.

Further, it is possible to determine a set position of the magnetic head supporting device by utilizing the groove 103. Therefore, it is easy to fit the magnetic head supporting device even though the size of the slider 1 is reduced.

It is desirable that both edges in the longitudinal direction of the medium-opposing surface 101, which constitute an air discharging end and an air in-flowing end respectively, are formed in an arched form in order to eliminate the dragging of the magnetic head to the magnetic disk at a contact-starting time.

In this embodiment, the bonding pads 3, 4 are exposed at both side end surfaces 104, 105 in the width direction of the slider 1 which are different from the end surface in the longitudinal direction of the slider where the reading/writing element 2 is provided. With such construction, the width of the end surface where the reading/writing element 2 is attached can be reduced, hence, the surface area of the end surface is reduced, whereby the entire size of the thin film magnetic head can be made small. Further, a grinding operation of the surface of the protective film to expose the bonding pads 3, 4 to which lead wires are to be bonded, is unnecessary, and therefore manufacturing steps can be simplified.

Grooves 5, 6 are formed at the both side end surfaces 104, 105 in a linear form in the entire length of the slider so that the grooves 5, 6 are connected to the bonding pads 3, 4. The grooves 5, 6 are to receive lead wires or supporting arms introduced from the head supporting device and have a shape corresponding to the lead wires or the supporting arms to be connected. In this embodiment, the shape of the grooves 5, 6 is a semi-circular form in consideration that lead wires having a circular form in cross-section are connected to the bonding pads. By forming the above-mentioned grooves 5, 6, the lead wires or supporting arms to be introduced to the magnetic disk device can be certainly connected to the bonding pads 3, 4 even when the size of the magnetic head is reduced.

The reading/writing element 2 is a thin film magnetic head element prepared in accordance with the same process as an IC manufacturing technology.

Figure 2:
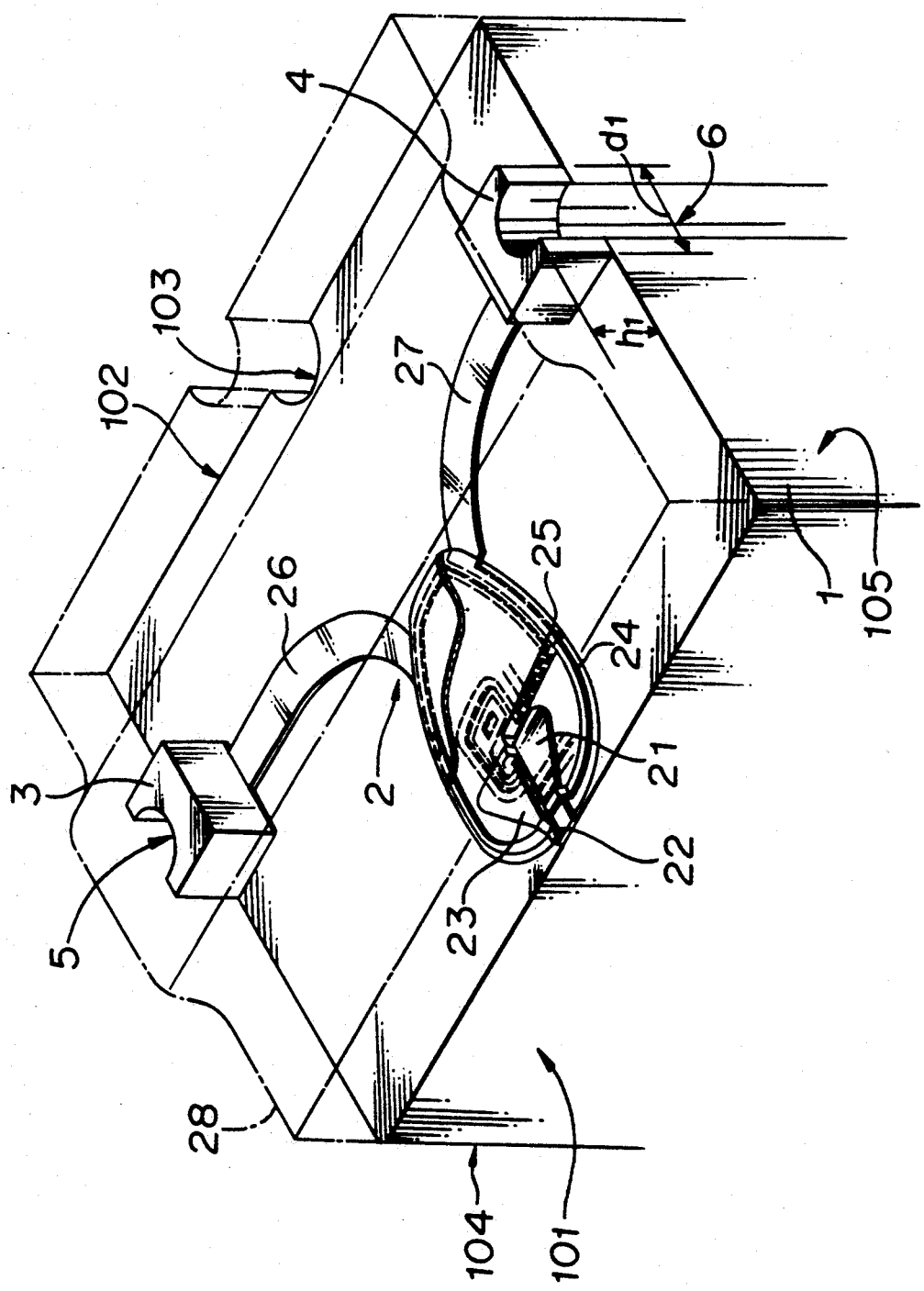
FIG. 2 is a perspective view partly omitted of an embodiment of the thin film magnetic head in which an arrangement of a reading/writing element and bonding pads is illustrated in detail.
Figure 3:
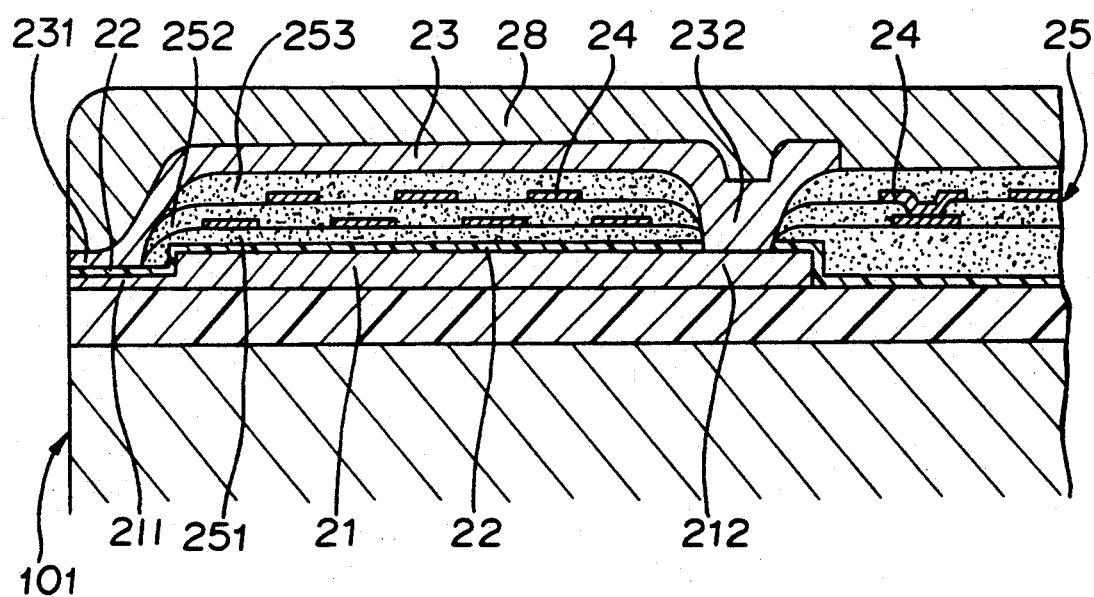
FIG. 3 is an enlarged longitudinal cross-sectional view of the reading/writing element.

FIG. 2 is an enlarged perspective view partly omitted of an embodiment of the reading/writing element, and FIG. 3 is an enlarged longitudinal cross-sectional view partly omitted of the reading/writing element 2. In FIGS. 2 and 3, a reference numeral 21 designates a lower magnetic film, a numeral 22 designates a gap film made of a material such as alumina, a numeral 23 designates an upper magnetic film, numerals 24 designate conductor coil films, a numeral 25 designates an insulating film made of an organic resinous material such as novolak resin, numerals 26 and 27 designate lead electrodes, and a numeral 28 designates a protective film.

End portions of the lower and upper magnetic films 21, 23 constitute pole sections 211, 231 which oppose interposing the gap film 22 having a small thickness so that the pole sections perform reading and writing function. Numerals 212, 232 designate yoke portions which are opposite the pole sections 211, 231 to connect the lower and upper magnetic films 21, 23 together.

The insulating film 25 is constituted by a plurality of layers of insulating films 251-253. The conductor coil films 24 are formed on the insulating films 251, 252 so that the conductor coil films 24 surround around the connecting portion by the yoke portions 212, 232 in a spiral form.

The lead electrodes 26, 27 have their ends connected to both ends of the conductor coil films 24 and other ends connected to the bonding pads 3, 4.

Figure 4:
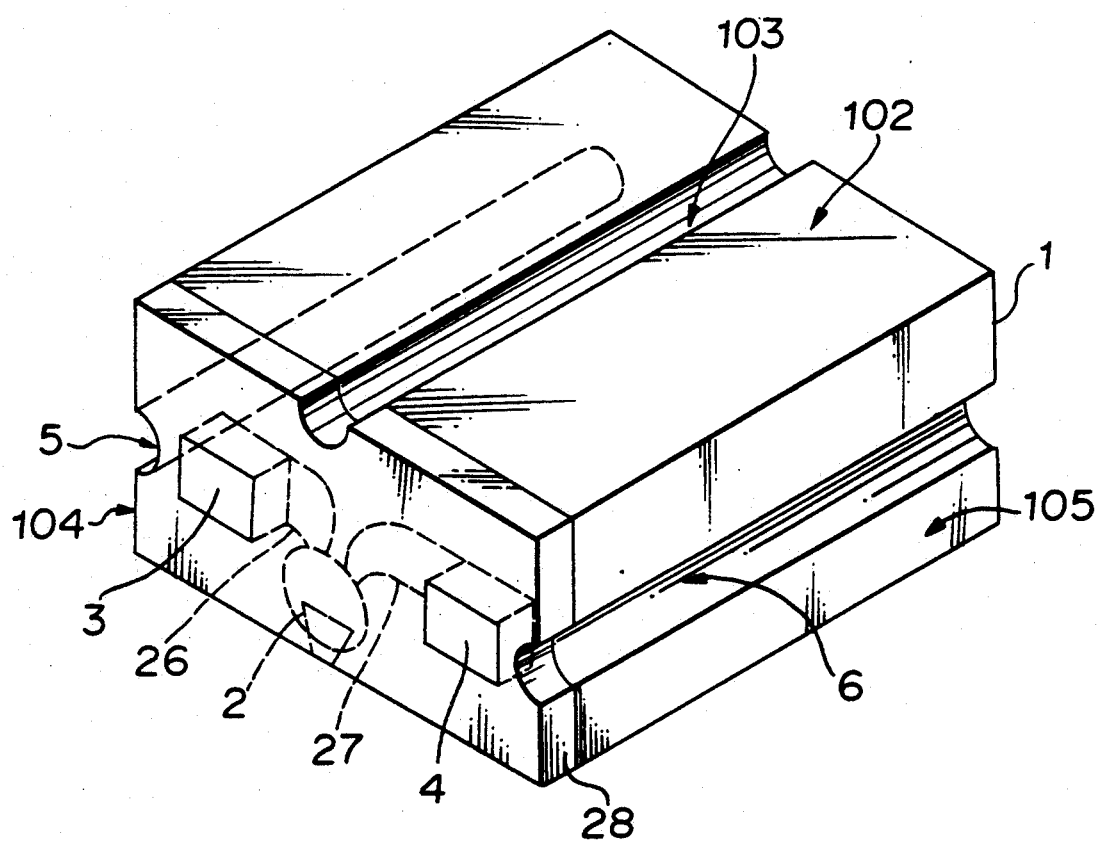
FIG. 4 is a perspective view of another embodiment of the thin film magnetic head according to the present invention.

FIG. 4 shows another embodiment of the thin film magnetic head according to the present invention. In this embodiment, grooves 5, 6 are formed at both side end surfaces of the slider 1. Bonding pads 3, 4 are exposed on the end surface where the reading/writing element are disposed.

Figure 5:
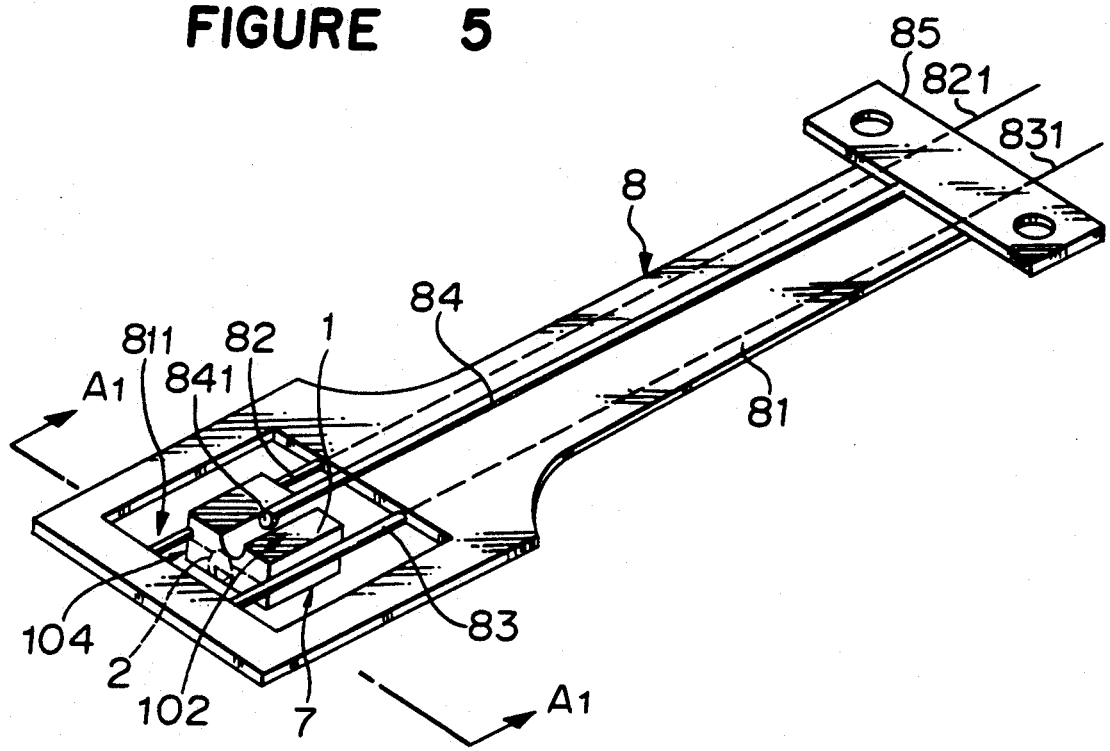
FIG. 5 is a perspective view of a magnetic head supporting device on which an embodiment of the thin film magnetic head according to the present invention is held.
Figure 6:
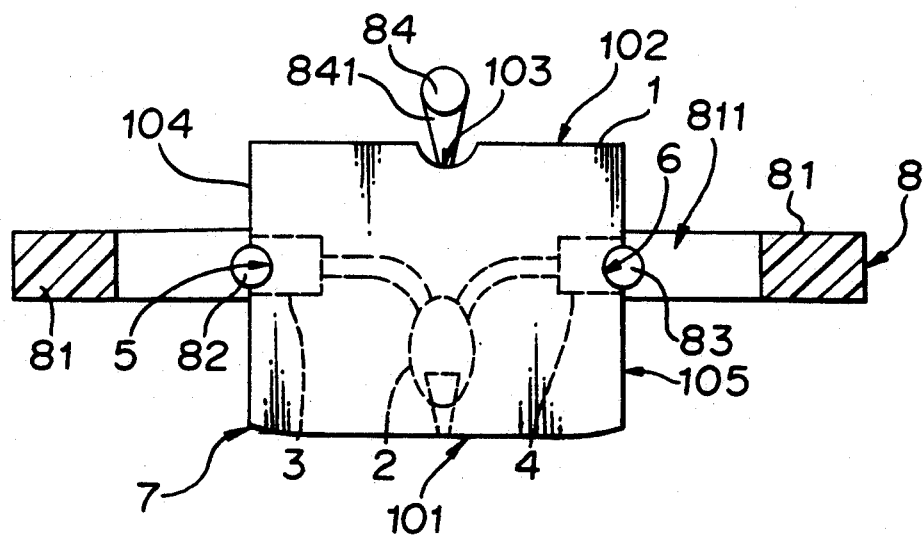
FIG. 6 is an enlarged cross-sectional view taken along a line A1—A1 in FIG. 5.

FIG. 5 is a perspective view of a magnetic head supporting device on which the thin film magnetic head of the present invention is mounted, and FIG. 6 is an enlarged cross-sectional view taken along a line A1—A1 in FIG. 5. In FIG. 6, the magnetic head supporting device 8 holding the thin film magnetic head 7 includes a flexible member 81, head supporting arms 82, 83, a magnetic head pressing arm 84 and a fitting piece 85.

The flexible member 81 is formed in a plate-like shape by using a polymeric resinous material as an insulating material. As a polymeric material used for the flexible member 81, such a material, e.g. polyimide resin as that having a mechanical strength durable to repeated bending operations and twisting operations and showing an appropriate spring function and elongation is suitable. At one side of the flexible member 81, there is provided an opening 811 where the thin film magnetic head 7 is placed. Thus, by forming the flexible member 81 by a polymeric resinous material, the flexible member 81 shows a weak spring function and a high degree of freedom of twisting and elongation in comparison with the conventional flexible member made of a resilient metallic material such as stainless steel can be obtained. Accordingly, even in a case that the size of the magnetic head is reduced to reduce a flying height in order to obtain high density magnetic recording, there is still obtainable a balance between the dynamic pressure produced at the slider 1 and the spring function of the flexible member 81, and therefore, a stable control of the posture of the magnetic head can be obtained. Further, the flexible member 81 made of a polymeric resinous material allows easy processing.

The magnetic head supporting arms 82, 83 are embedded in the flexible member 81. Especially, each one end of the supporting arms 82, 83 is attached to the flexible member 81 so that they are spaced apart from each other in a parallel relation in the opening. In this embodiment, the supporting arms 82, 83 are formed of an electric conductive material. Accordingly, they function as lead wires for the magnetic head 7. Each other end 821, 831 is led outside the flexible member 81 so that the other ends are connected to the magnetic disk drive.

A fitting piece 85 made of a rigid material such as metal is integrally attached to the other end of the flexible member 81 by means of bonding. The magnetic head pressing arm 84 extends from the fitting piece 85 through the upper surface of the flexible member 81 to an area of the opening 811 so that the free end 41 of the pressing arm 84 terminates a position between the magnetic head supporting arms 82, 83 which are exposed in the opening 811.

In the combination of the magnetic head supporting device 8 and the magnetic head 7, the magnetic head supporting arms 82, 83 are respectively fitted to the grooves 5, 6 formed in the both side surfaces 104, 105 of the slider 1 by means of soldering. The free end portion 841 of the pressing arm 841 is inserted in the groove 103 formed in the surface 102 of the slider 1. The free end 841 of the magnetic head pressing arm 84 is in spring-contact with the groove 103 of the slider 1 so that the thin film magnetic head 7 receives a load from the pressing arm 84 downwardly.

Figure 7:
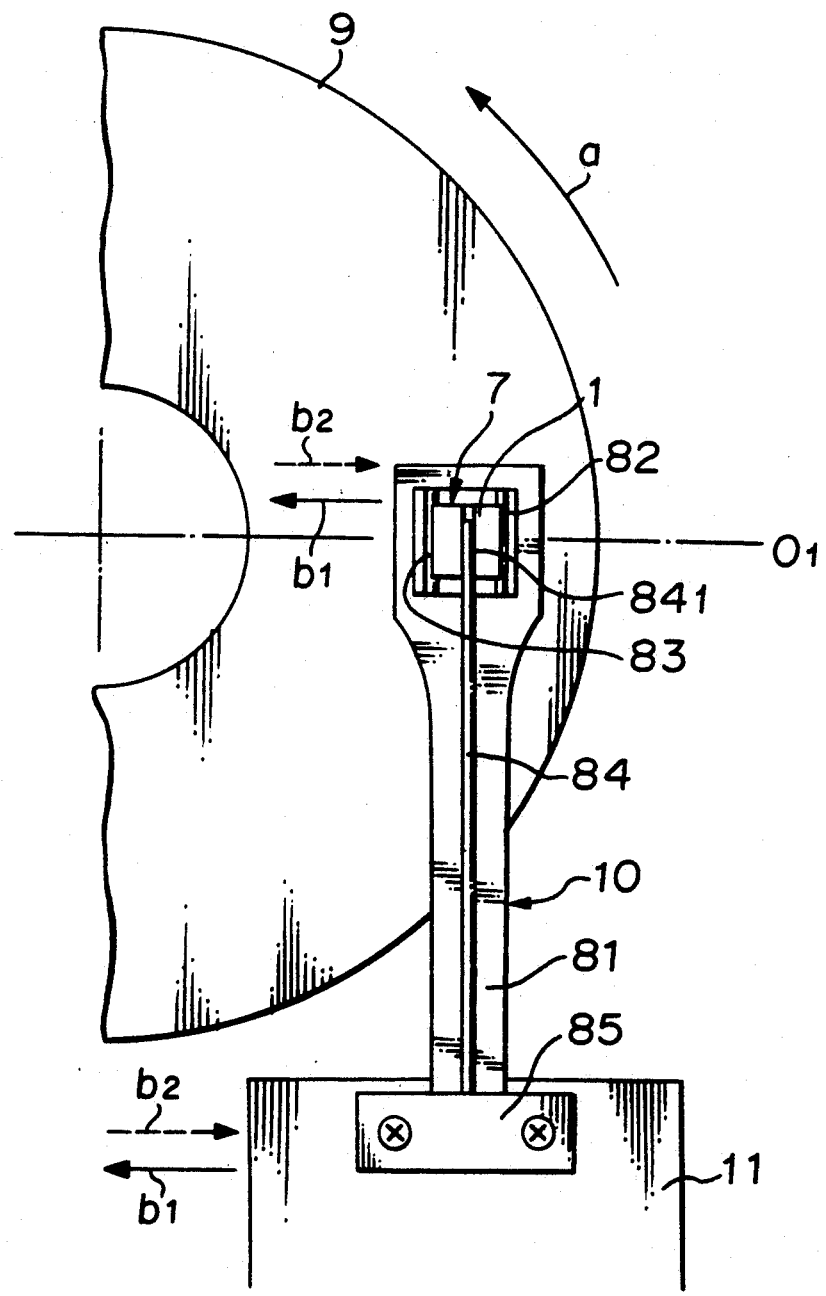
FIG. 7 is a plane view showing a relation of the magnetic head supporting device as in FIG. 5 to a magnetic disk.
Figure 8:
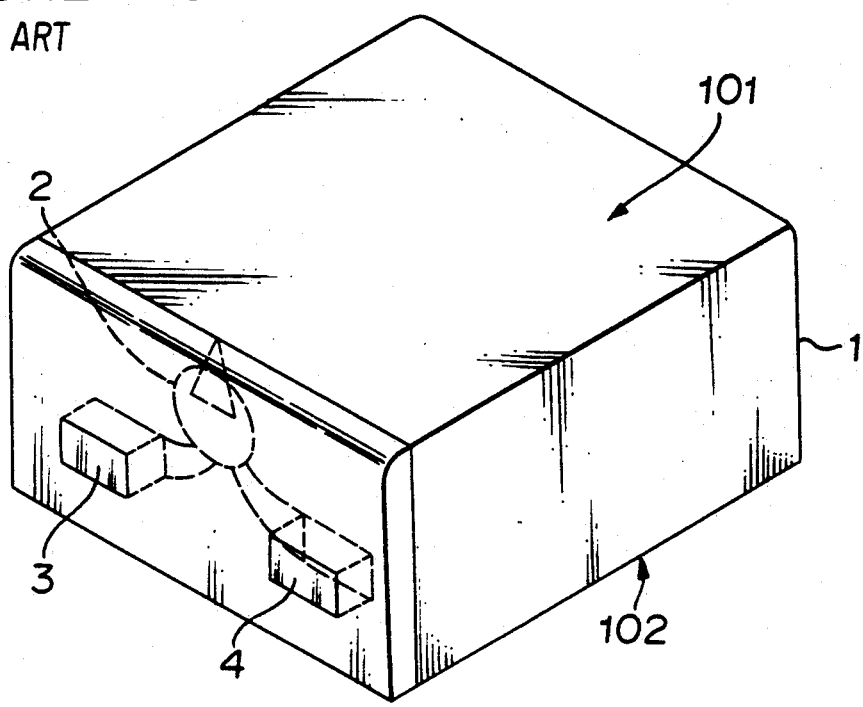
FIG. 8 is a perspective view of a conventional thin film magnetic head.
Figure 9:
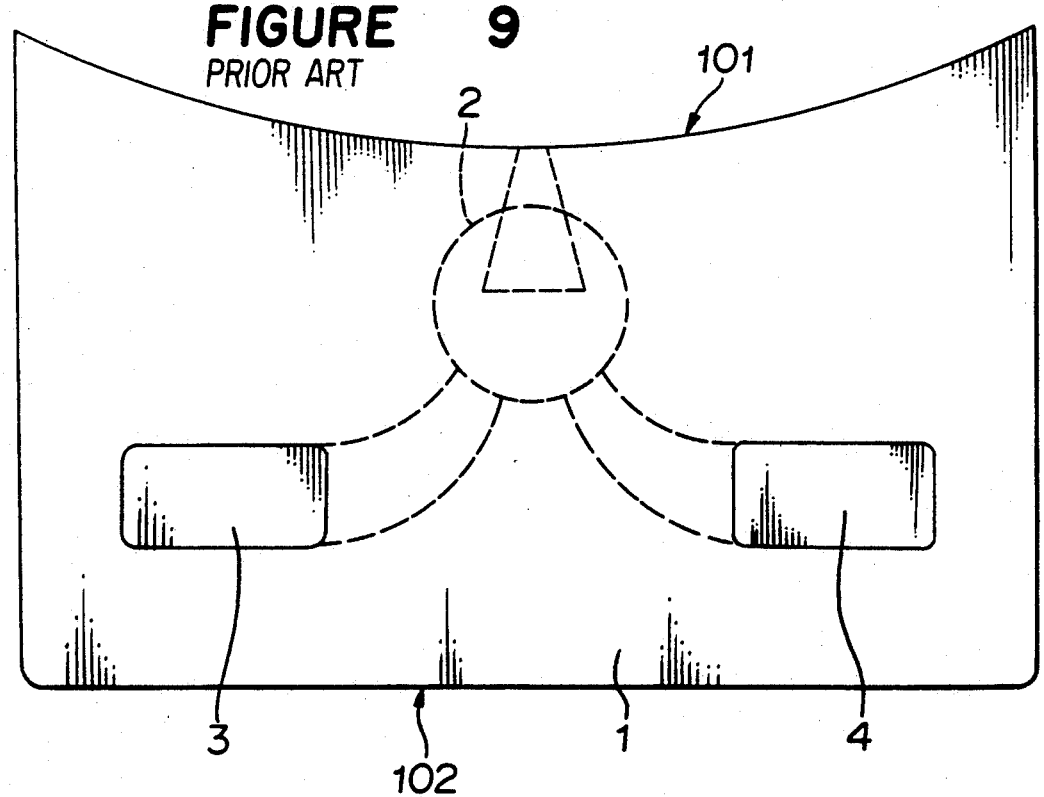
FIG. 9 is a diagram showing a problem in the conventional thin film magnetic head.

FIG. 7 is a plane view showing a relation between the magnetic head supporting device and a magnetic disk, wherein a numeral 9 designates a magnetic disk, a numeral 10 designates a magnetic head supporting device and a numeral 11 designates a position determining unit. The magnetic disk 9 is driven to rotate in the direction indicated by an arrow mark a by means of a rotation driving unit (not shown). The magnetic head supporting device 10 is driven by the position determining unit 11 so that the thin film magnetic head 7 performs a linear movement on the diameter $O_1$ of the magnetic disk 9 in the direction indicated by an arrow mark $b_1$ or $b_2$. Thus, reading operations or writing operations can be attained on a track in the magnetic disk 9.

In the above-mentioned embodiments, explanation is made as to use of an in-plane recording and reproducing thin film magnetic head. However, the present invention is applicable to a vertical magnetic recording and reproducing thin film magnetic head. Further, the present invention is applicable not only to a two terminal type thin film magnetic head which is of a type as in the embodiments of the present invention, but also a three terminal type thin film magnetic head having a center tap.

Thus, in accordance with the present invention, the following effects can be obtained.

(a) Since the reading/writing element is disposed at an end surface in the longitudinal direction of the slider when the longitudinal direction and the width direction are determined on the medium-opposing surface of the slider and the slider has a linear groove in the surface opposite the medium-opposing surface in the intermediate portion in the width direction and along the longitudinal direction, the groove functions so that the medium-opposing surface of the slider has a curved convex surface. Accordingly, a thin film magnetic head capable of providing good head touching, reducing a spacing loss, minimizing a head crush and increasing durability can be obtained.

(b) Since a groove is formed in the surface opposite the medium-opposing surface of the slider, the groove is used as a position-determining means for a magnetic head supporting device. Accordingly, there is obtainable a small-sized thin film magnetic head which facilitates the determination of position of the magnetic head supporting device.

(c) Since the entire shape and size of the slider is reduced, a thin film magnetic head providing a low flying height, a small spacing loss, suitable for high density recording, increasing a resonance frequency in association with a gimbal device, eliminating crashing and improving durability is obtainable. Further, there is obtainable a thin film magnetic head wherein a proper balance is maintained between a dynamic pressure and the pressure of a supporting spring in a combination of the gimbal device; the posture of flying of the device can be desirably maintained; floating characteristics are stabilized and accessing movements are quickly obtainable.

Obviously, numerous modifications and variations of the present invention are possible in light of the above teachings. It is therefore to be understood that within the scope of the appended claims, the invention may be practiced otherwise than as specifically described herein.

What is claimed is:

1. A slider for a thin film magnetic head, comprising:
    a medium-opposing surface extending in a longitudinal direction and in a width direction;
    an opposite surface remote from said medium-opposing surface and arranged substantially parallel to said medium-opposing surface;
    an end surface at a longitudinal end of said slider and arranged substantially perpendicular to the medium-opposing surface and to the opposite surface;
    a reading/writing element attached to said end surface, said reading/writing element being disposed in said end surface substantially at a midpoint thereof in the width direction; and
    a linear groove in said opposite surface, extending in the longitudinal direction and substantially bisecting the width of said opposite surface;
    wherein said medium-opposing surface defines a convex form having a peak located in the vicinity of said reading/writing element, said convex form of said medium-opposing surface being caused by a stress induced by said linear groove.

2. A slider according to claim 1, wherein said planar medium-opposing surface has no raised rails thereon.

3. A slider according to claim 1, further comprising:
    a first side surface substantially perpendicular to said end surface and having a first groove extending along the entire length thereof for receiving a first magnetic head supporting arm therein;
    a second side surface, substantially parallel to said first side surface and having a second groove extending the entire length thereof for receiving a second magnetic head supporting arm therein.

4. A slider according to claim 3, further including a first bonding pad located along said first side surface and a second bonding pad located along said second side surface, wherein said first and second grooves pass through said first and second bonding pads, respectively.

5. A slider according to claim 3, further comprising first and second bonding pads exposed at said end surface, said first and second bonding pads being electrically connected to said reading/writing element by first and second lead electrodes, respectively.

6. A magnetic reading/writing apparatus comprising:
    a magnetic head supporting device;
    a slider mounted on said magnetic head supporting device and carrying a reading/writing element thereon;
    a medium-opposing surface provided on said slider and extending in a longitudinal direction and in a width direction;
    an opposite surface on said slider remote from said medium-opposing surface and arranged substantially parallel to said medium-opposing surface;
    an end surface at a longitudinal end of said slider and arranged substantially perpendicular to the medium-opposing surface and to the opposite surface;
    a reading/writing element attached to said end surface, said reading/writing element being disposed in said end surface substantially at a midpoint thereof in the width direction;
    a linear groove in said opposite surface, extending in the longitudinal direction and substantially bisecting the width of said opposite surface; and
    a magnetic head pressing arm mounted on said magnetic head supporting device in spring-contact with said linear groove;
    wherein said medium-opposing surface defines a convex form having a peak located in the vicinity of said reading/writing element, said convex form of said medium-opposing surface being caused by a stress induced in said slider by said linear groove.

* * * * *